Sept. 11, 1928.
J. H. COPE
1,684,264
PUSH OFF FOR SWEEP RAKES
Filed Feb. 27, 1926      3 Sheets-Sheet 1
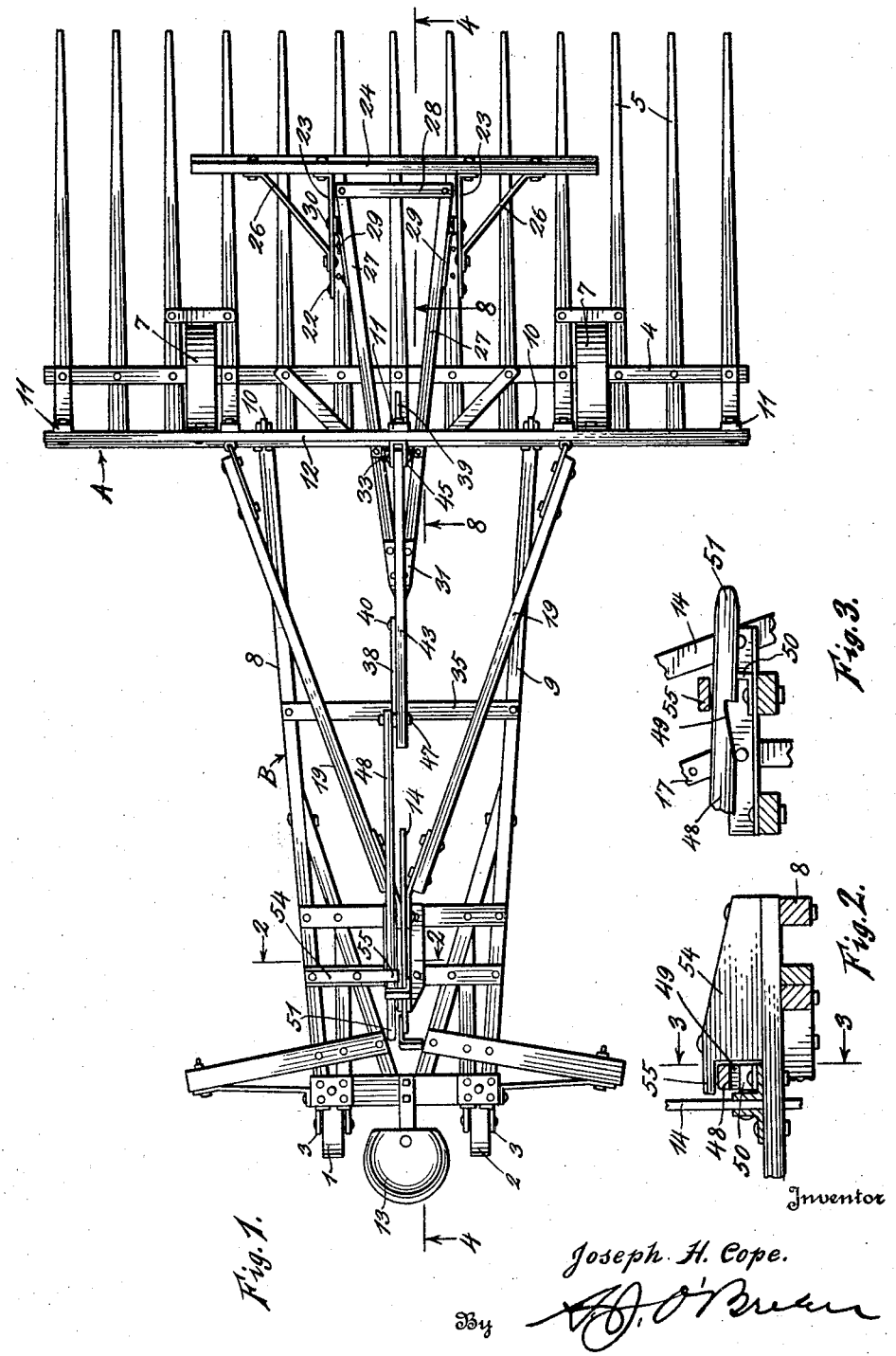
Inventor
Joseph H. Cope.
By
Attorney Sept. 11, 1928.
J. H. COPE
1,684,264
PUSH OFF FOR SWEEP RAKES
Filed Feb. 27, 1926 3 Sheets-Sheet 2
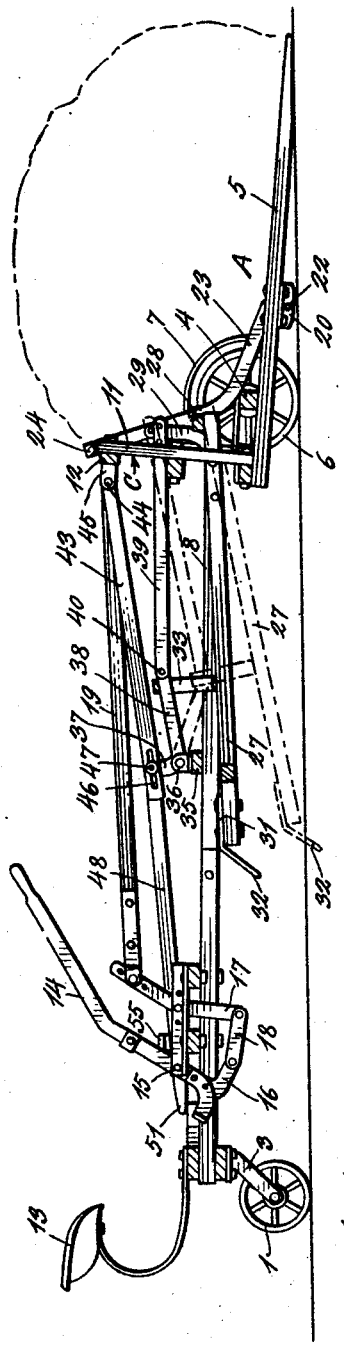
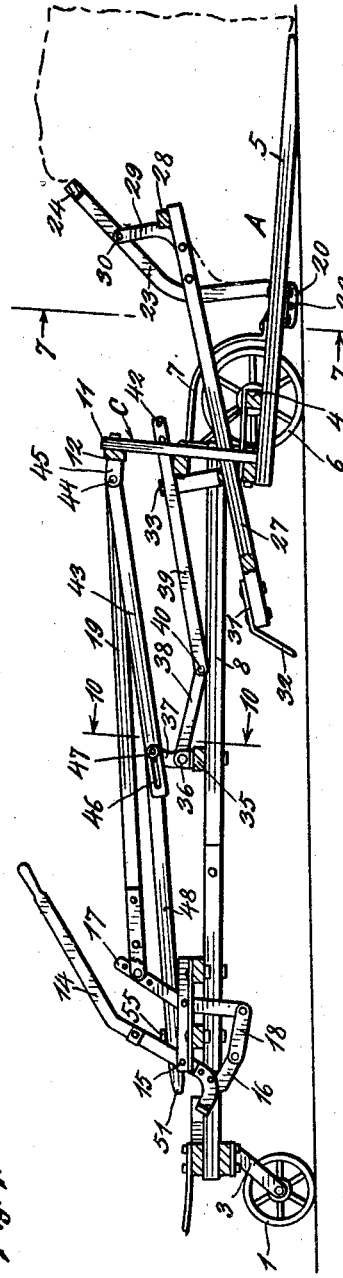
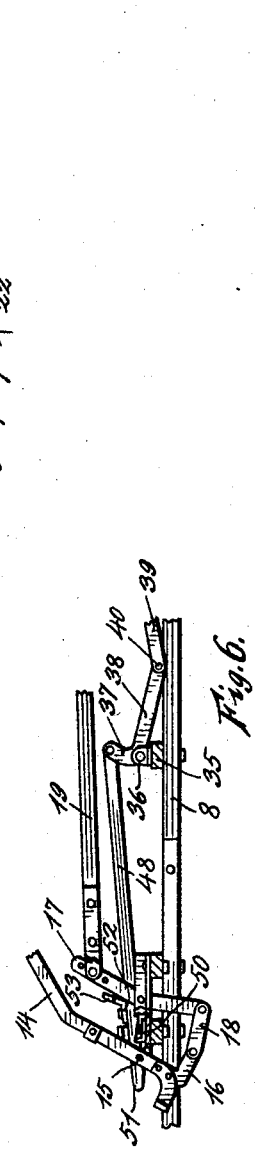
Inventor
Joseph H. Cope.
By
Attorney Sept. 11, 1928.
J. H. COPE
1,684,264
PUSH OFF FOR SWEEP RAKES
Filed Feb. 27, 1926   3 Sheets-Sheet 3
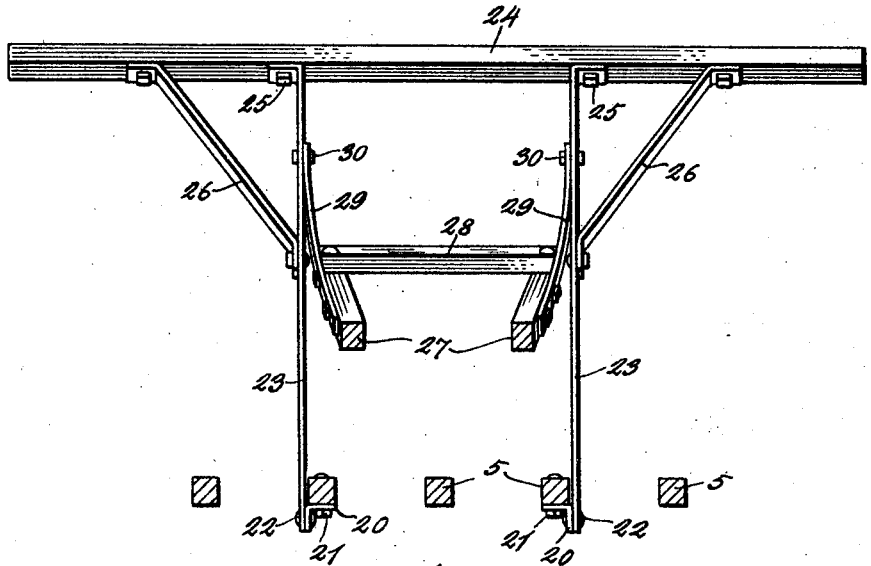
Fig. 7.
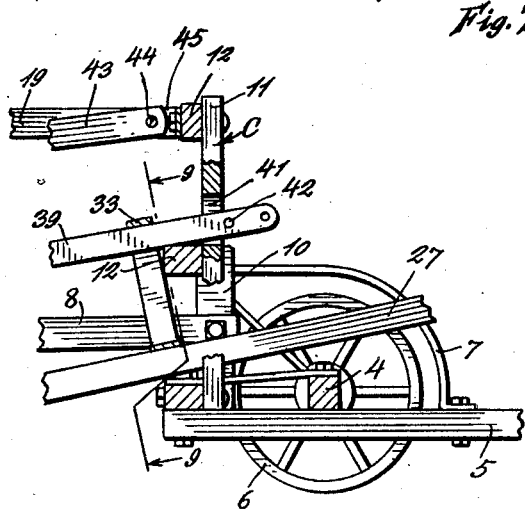
Fig. 8.
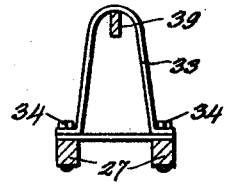
Fig. 9.
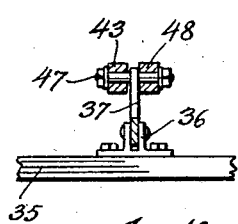
Fig. 10.
Inventor
Joseph H. Cope.
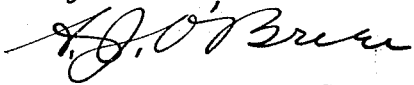
By
Attorney Patented Sept. 11, 1928.

1,684,264

UNITED STATES PATENT OFFICE.

JOSEPH H. COPE, OF DENVER, COLORADO.

PUSH OFF FOR SWEEP RAKES.

Application filed February 27, 1926. Serial No. 91,053.

This invention relates to improvements in sweep rakes of the type described and claimed in United States Letters Patent No. 1,205,973, granted to me on the 28th day of November, 1916.

In rakes of this type the rake head is located in front of the horses and is pushed against the hay that is to be gathered. When a load of hay has been collected, the rake head is tilted upwardly so that the entire weight of the load will be carried on the wheels to which the rake head is attached. With the rake head in the elevated position, the load can be transported to the stacker. The stacker is a device employed for elevating the hay and for depositing it onto the stack and is provided with a stacker head that resembles the rake head. The hay must be transferred from the rake head to the stacker head and this is accomplished by driving the rake towards the stacker and placing the two in such a position that the rake head with its load is directly above the stacker head and then lowering the rake head after which the rake is backed away thereby withdrawing the rake head and leaving the hay on the stacker head. When the rake is backed away from the stacker the hay has a tendency to follow and this makes it necessary to provide some push off means that will hold the hay so as to prevent it from following the rake head and it is to improvements in the push off device to which this invention relates.

In order to describe my invention I have shown a sweep rake to which my invention has been applied, reference will therefore be had to the accompanying drawings in which my invention has been illustrated and in which:

Fig. 1 is a plan view of a sweep rake to which my invention has been applied;

Fig. 2 is a section taken on line 2—2, Fig. 1;

Fig. 3 is a section taken on line 3—3, Fig. 2;

Fig. 4 is a central longitudinal section taken on line 4—4, Fig. 1 and shows the push off device in normal or inoperative position;

Fig. 5 is a view similar to that shown in Fig. 4 but with the push off device in its extreme operative position;

Fig. 6 is a view similar to the views shown in Figs. 4 and 5 but showing only a portion of the rake and is intended to illustrate a certain modified construction;

Fig. 7 is a section taken on line 7—7, Fig. 5;

Fig. 8 is a section taken on line 8—8, Fig. 1;

Fig. 9 is a section taken on line 9—9, Fig. 8; and

Fig. 10 is a section taken on line 10—10, Fig. 5.

Since this invention relates more particularly to the push off mechanism, I shall limit my description of the rake construction to those parts that must be described in order to explain this invention. The sweep rake to which my improved push off mechanism has been applied, comprises a rake head that has been designated as a whole by the letter A and a frame B to which the rake head is tiltably connected. Secured to the rear end of the frame B are two wheels 1 and 2 which are mounted in inclined forks 3 that have a pivotal connection with the frame and function in the manner of ordinary casters. An axle 4 is secured to the upper surface of the teeth 5 of the rake head and carry wheels 6 whose upper surfaces are shielded by the guards 7. The frame B has side members 8 and 9 whose forward ends are pivoted to plates 10 that in turn are fastened to the vertical framework C at the rear of the rake head. The framework C consists of several upright members 11 to which transverse horizontal bars 12 are connected. The frame B is provided with a seat 13 and a control lever 14 which is pivoted at 15 and has its lower end 16, which is bent in a forward direction, connected with the lower end of the lever 17 (by means of a link 18) whose upper end is connected with the vertical end framework C by means of a rigid bar 19. Since the bars 8 and 9 are connected with the vertical framework C at a lower point than bar 19, it is evident that the rake head A may be tilted about the axis of the wheels 6 by means of the handle 14. When the rake is being loaded the teeth are tilted into the position shown in Figs. 4 and 5 and when the rake has been fully loaded the rake head is tilted in a counter clockwise direction until the teeth are at least parallel with the ground or slightly inclined downwardly in a rearward direction. For the purpose of assisting in unloading the hay from the rake, I have provided it with a push off mechanism that I will now describe. I have provided two of the teeth 5 with angle iron brackets 20 which are secured to the underside of each of these teeth by means of bolts or rivets 21. Pivoted at 22 to the vertical side of each of the brackets 20, is a bar 23 which, is bent in the manner shown in Figs. 4 and 5. A bar 24 is secured to the free ends of the bars 23 by means of bolts or rivets 25. Diagonal braces 26 extend from the bar 24 to the bars 23 and serve to hold the parts rigid. The assembly comprising the bars 23, 24 and braces 26 may be moved about the pivots 22 to the positions shown in Figs. 4 and 5 or to any intermediate position. For the purpose of moving the push off assembly about its pivot, as the rake is moved rearwardly, a triangular brace comprising sides 27 and a base member 28 is employed. Secured to the sides, near the base, are curved bars 29 which are pivoted to the sides 23 at 30. Secured to the apex of the triangle is a plate 31 whose end 32 is inclined downwardly so as to form a prong that will penetrate the surface of the ground in the manner indicated by dotted lines in Fig. 4. For a purpose which will presently appear, a yoke member 33 has been secured to the upper surface of the bars 27, by means of bolts 34, in the manner shown in Fig. 9. A bar 35 is secured to the top of the sides 8 and 9 and carries a bracket 36 to which is pivoted a bell crank lever having arms 37 and 38. A straight bar 39 is pivoted at 40 to the end of the arm 38 and has its front end slidably mounted in the slot 41 (Fig. 8) in one of the uprights 11 and has two or more openings 42 for the reception of a pin that serves as a limit stop. A rigid bar 43 has its forward end pivoted at 44 to a bracket 45 that is attached to one of the transverse bars 12. The other end of bar 43 has an elongated opening or slot 46 through which the bolt 47 extends. The bolt 47 also passes through the end of the arm 37 and through a hole in the end of the rigid locking bar 48. The other or free end of the bar 48 has a notch 49 which is adapted to engage the vertical side of the angle 50 when the parts of the push off device are in the position shown in Fig. 4. When the parts are to be released so that they may assume the position shown in Fig. 5, this can be accomplished by lifting the end 51 of the bar 48 so as to raise it above the angle 50.

Let us now assume that the parts are in the position shown in Fig. 4 and that the rake head contains a load of hay which it is desired to unload. Before the rake is moved rearwardly the operator lifts the end 51 by inserting his toe underneath the same; this permits the bar 39 and the triangular push off member comprising the bars 27 to drop down into the dotted line position, in which position the prong 32 will rest upon the ground. The rake is now moved in a rearward direction. As soon as the rake begins to move rearwardly the prong 32 will enter the ground and hold the bars 27 from moving rearwardly. As the rake and rake head continue to move rearwardly, the push off frame that comprises the bars 23 and the bar 24 will be rotated about the pivots 22 towards the position shown in Fig. 5. Since the bars 27 are connected to the side bars 23 at a point between the pivots 22 and the bar 24, the latter will move forwardly at a greater rate than that at which the rake moves rearwardly which helps to compensate for the compression of the hay. As the rake moves rearwardly, the front end of the triangular push member will rise slightly owing to the fact that the pivots 30 travel in the arc of a circle; this rising motion will cease, however, as soon as the pivots 30 reach a position directly above the pivots 22 after which they will move downwardly along the arc of the circle which forms the locus of their travel. It will be noted that the yoke member 33 encircles the bar 39 which is inclined in the manner shown. When the parts approach the position shown in Fig. 5, the strap or yoke 33, owing to the fact that the part of the bar 39 that is directly beneath the yoke 33 is higher and to the fact that the front end of the frame comprising the arms 27 is moving downwardly, will come into contact with the bar 39 and any further movement of the parts will raise the prong 32 out of the ground and into the position shown in Fig. 5.

If the lever 14 is now moved rearwardly or in a counter-clockwise direction, the rake head will be moved in the same direction; this will cause the bar 43 to move rearwardly and when the bolt 47 is engaged by the end of the slot 46, the bell crank lever will be rotated about its pivot thereby raising the arm 38 and attached bar 39 and moving the bar 48 rearwardly until the angle 50 will engage the notch 49, when this occurs the handle 14 can be moved forwardly again so as to bring the rake head into operative position without in any way effecting the adjustment of the bar 39. The bar 43 on account of the slot 46 has sufficient lost motion to permit the head to be tilted into or out of operative position without affecting the adjustments of the push off device. When the parts are in the position shown in Fig. 4 the prong 32 is held above the ground and cannot therefore interfere in any way with the normal operation of the rake.

In Fig. 6 I have shown a modified construction in which the bar 43 is dispensed with. In place of the bar 43 I have provided a bracket 52 that is secured to the bar 48. This bracket has an arm or projection 53 that extends into the path of the lever 17. When the lever 14 is moved counter-clockwise, the lever 17 will engage the projection 53 and move the bar 48 rearwardly until the notch 49 is engaged by the angle 50. The bar 43 and the bracket 52 are equivalent means for moving the push off mechanism to inoperative position. The block 54 (Fig. 2) has a projecting portion 55 that extends over the top of the bar 48 so as to form a stop that prevents it from being moved too far.

It will be noted that the push off device described has several important features of construction. It has a push off member provided with a prong adapted to enter the ground and means for holding this prong out of contact with the ground. It has also means for automatically raising the prong out of contact with the ground when the push off device has been moved to the end of its stroke and besides this it has means for moving the push off bar 24 in a forward direction at a greater speed than that at which the rake head is moved in a rearward direction whereby the hay is compressed and moved towards the end of the rake teeth.

Having now described my invention what is claimed as new is:

1. A sweep rake comprising, in combination, a frame, a rake head tiltably connected to the frame, means for tilting the rake head with respect to the frame, a push off frame having its lower end pivotally connected with the rake head, a push off bar having one end pivotally connected with the push off frame between the pivot point and the free end, the free end of said bar having means for engaging the ground, and means for raising the free end of the bar out of engagement with the ground when the rake head is tilted in one direction.

2. A sweep rake comprising, in combination, a frame, a rake head provided with teeth tiltably connected with the frame, means for tilting said rake head, a push off device comprising one portion pivotally connected with the teeth and a bar having one end pivoted to the portion that is connected with the teeth, said bar being mounted to have its free end move into and out of contact with the ground, means for raising said bar when the rake head is tilted in one direction and means for holding the member in raised position during further tilting of the rake head.

3. A sweep rake comprising, in combination, a rake head, and a push-off device associated therewith, said push-off device having a frame pivotally attached to the lower part of the rake head and freely movable through a limited arc, said frame extending upwardly from its pivot and a rigid frame having its forward end pivoted to the pivoted frame and its rear end provided with means to penetrate the surface of the ground, the front end of said rigid frame being higher than the rear end.

4. A sweep rake comprising, in combination, a rake head having a plurality of teeth arranged in parallel relation in a common plane, means comprising a pair of spaced wheels for supporting said rake head, means for tilting the rake head about the axis of the wheels, a push-off frame having its lower end pivoted to the teeth and extending in an upward direction, said frame being free to move through a limited arc, a rigid frame having its forward end pivoted to the pivoted push-off frame at a point spaced from the pivots about which the latter frame moves, said rigid frame being downwardly and rearwardly inclined, the rear end of said rigid frame being provided with means for penetrating the ground, and means for moving the penetrating means out of contact with the ground and for holding it in inoperative position.

5. A sweep rake having a rake head provided with a plurality of forwardly projecting teeth, a push-off frame having one end pivoted to said rake teeth and free to swing in an arc about said pivot, a rigid frame having its forward end pivotally attached to the push-off frame between the pivot and the free end thereof, and having its rear end free to be moved into and out of contact with the ground and means for automatically raising the rear end of the rigid frame when it has been moved forwardly to a predetermined extent.

6. In a sweep rake, in combination, a rake head having forwardly projecting teeth, means comprising spaced wheels for supporting said rake head, a push-off frame having its lower end pivoted to said teeth and free to be moved through a limited arc, a rigid frame having one end attached to the push-off frame, the free end of said rigid frame being supported for movement into engagement with the ground whereby it will turn the push-off frame about its pivot when the rake head is moved rearwardly, means for automatically raising the free end of the rigid frame out of contact with the ground when the push-off device has moved a predetermined distance, means for tilting the rake head and means operated by the tilting means for raising the free end of the rigid frame and for locking it out of contact with the ground.

7. In a sweep rake, in combination, a rake head, a push-off frame associated therewith, a pusher bar connected at one end with the push-off frame and having the other end free to move into and out of contact with the ground, means made operative by the forward movement of the push-off device for raising the free end of the pusher bar out of contact with the ground when the push-off frame has been moved a predetermined distance, means for tilting said rake head and means for locking the pusher bar in raised position whenever the rake head is tilted in one direction.

8. A sweep rake comprising in combination, a rake head having a transversely extending frame member to which the rear ends of a plurality of rake teeth are secured, a push-off frame pivotally attached at its lower end to the rake teeth, said frame when in inoperative position occupying a position in which all parts thereof are to the rear of a vertical plane passing through the pivots, a push bar connected at its forward end to said frame at a point spaced from the pivot whereby when the bar moves the push-off frame in a forward direction the front end of the bar will move along an arc, said push bar extending over the transverse frame member and having its rear end free to engage the ground whereby said bar will come into contact with the transverse frame member when the push off frame has been rotated forwardly through a predetermined arc and whereby a further movement of the push-off frame will raise the rear end of the push bar.

9. A sweep rake comprising, in combination, a rake head having a transversely extending frame member to which the rear ends of a plurality of rake teeth are secured, a push-off frame pivotally attached at its lower end to the rake teeth, said frame when in inoperative position occuping a position in which all parts thereof are in a position to the rear of a vertical plane passing through the pivots, a push bar connected at its forward end to said frame at a point spaced from the pivot whereby when the bar moves the push-off device in a forward direction the front end of the bar will move along an arc, said push bar extending over the transverse frame member and having its rear end free to engage the ground, means for tilting the rake head, means for raising the free end of the pusher bar when the rake head is tilted in one direction and means for locking the push bar in raised position.

In testimony whereof I affix my signature.

JOSEPH H. COPE.